July 14, 1942.                P. A. BLEAKLEY                2,290,088
                TREATMENT OF GLASS STRUCTURAL ELEMENTS
                         Filed March 8, 1939
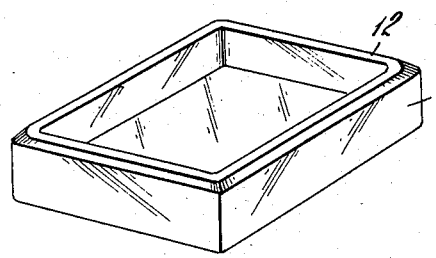
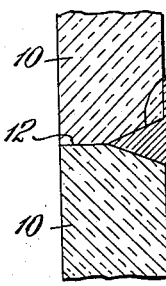
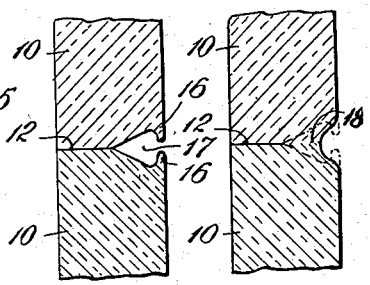
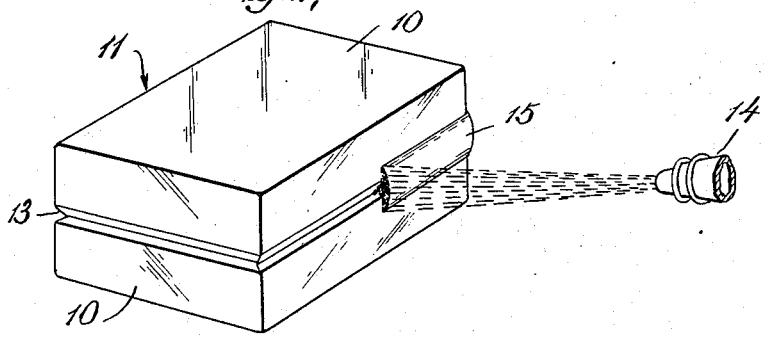
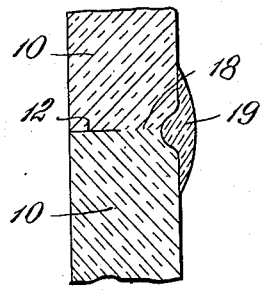
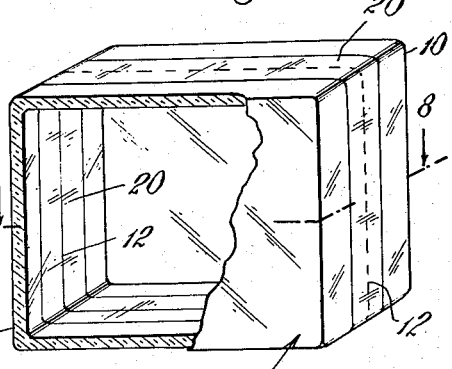
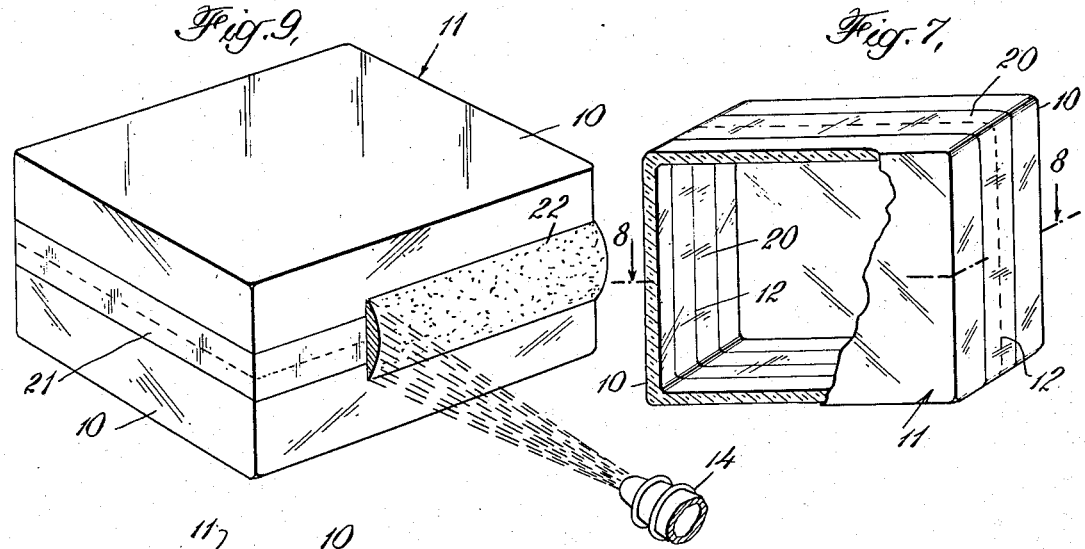
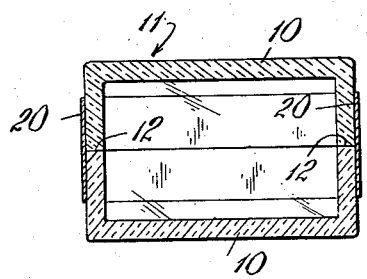
INVENTOR
Purling A. Bleakley
BY
Hogans, Leary & Campbell
ATTORNEYS Patented July 14, 1942

2,290,088

UNITED STATES PATENT OFFICE 2,290,088

TREATMENT OF GLASS STRUCTURAL ELEMENTS

Purling A. Bleakley, Toledo, Ohio, assignor, by mesne assignments, to The Bleakley Corporation, Toledo, Ohio, a corporation of Delaware Application March 8, 1939, Serial No. 260,468

3 Claims. (Cl. 49—82)

This invention relates to the treatment of hollow glass structural elements, having particular reference to methods for sealing or bonding of glass blocks of the type formed by securing together at their edges a plurality of dish-shaped glass parts, and to methods of coloring glass blocks.

It has been found that glass block parts which have been annealed and cooled to room temperatures cannot be heated up to temperature conducive to good bonding to form the unit block according to the usual method of dipping the engaging edges in molten glass, or coloring the blocks, without encountering a degree of block breakage which prohibits economical commercial bonding or coloring operations.

The present invention provides a method of treating glass blocks which insures a strong bonding of the engaging surfaces of the block parts, providing resistance to both horizontal and vertical stresses or shear between the sealed elements, and eliminating the necessity of reheating the blocks to approximately their melting temperatures before bonding. The invention further provides a method of mirror-finishing areas of the glass blocks, so that they have an unusually clear and bright appearance.

The invention may also be adapted to the coloring of glass blocks to obtain a characteristic color cast therein. If the glass blocks have been previously joined by processing similar to the commonly used dipped seal method, the bonding seam may be strengthened and made corrosion-resistant by a coating treatment as provided herein.

More particularly, the method of the present invention comprises disposition of a sealing material in molten state in the form of a spray jointly upon and between the abutting edges of the two dish-like parts constituting the finished glass block, the spray solidifying to form a band of sealing material. For greatest strength, the bonding agent should be metal, the latter preferably being deposited on the glass in an unoxidized state, the affinity of the metallic bonding agent for oxygen being utilized to flux the metal and the glass, the latter containing a high percentage of oxygen.

Tests have shown that a more secure stress-resisting bond is achieved if the abutting surfaces of the halves of a glass block are specially shaped to provide an outwardly-directed indentation as a receptacle for the bonding agent, this modification being particularly desirable when binders such as glass, porcelain, or ceramics are substituted for the aforementioned metallic binder.

As a part of this invention the above disclosed process may be modified to provide an internal mirror surface on the blocks, the mirror being formed by the sealing material, which in this case is preferably unoxidized aluminum. This modification may also be adapted to the coloring of glass blocks, projecting molten coloring material upon the bonding seams, or over the wall faces of the blocks.

To obtain best results in carrying out this invention, the glass block should be processed while it retains the heat inherent from its process of manufacture. This precaution prevents cracking or breaking of the glass due to sudden change of temperature resulting from application of molten metals or other material thereto.

It will thus be observed that this invention affords a simple and novel method of permanently bonding or coloring glass blocks with a minimum percentage of loss through breakage.

A more complete understanding of this invention may be had by reference to the accompanying drawing, wherein:

Figure 1 shows one-half of a glass block with one form of joining edge;

Fig. 2 illustrates a block with the halves in joined position during spray application of a binding agent;

Fig. 3 is a fragmentary cross-section of a block sealed in according to the process indicated in Fig. 2;

Fig. 4 is a cross-section of a modified form of joining edges;

Figs. 5 and 6 illustrate the formation of the bond with the modified joining edges of Fig. 4;

Fig. 7 is a perspective view of a mirror-finished block with a section of the front walls cut away;

Fig. 8 is a cross-section thereof along the line 8—8 of Fig. 7; and

Fig. 9 illustrates the process of spray-coating a dipped seal block with an acid-resisting material.

Referring to the drawing, Fig. 1 of the dish-shaped half section 10 of a glass block 11 is provided with a chamfered edge 12 so that when two of these half-sections are placed in abutting position, as shown in Fig. 2, their chamfered edges 12 form a V-shaped groove 13 adapted to receive the binding material, which is projected in molten form from spray gun 14. The said spray gun 14 is preferably of the type disclosed in my Patent No. 2,092,150, issued April 7, 1937, which receives metal or other material and projects it in the form of a molten spray of controlled density upon the surface to be treated, the spraying material being confined within a gaseous deoxidized envelope, whereby it is maintained hot and is protected from the outside air from the nozzle to the place of deposit. The gun 14 forms no part of the present invention, and further details thereof may be had upon reference to said patent.

In carrying out the invention, it is important that the distance between the block surface and the gun remain constant within small variations permissible for adjustment of the width of the bonding seam, the width of the spray increasing as the distance between the gun and block increases, and the heat control varying in accordance with distance. Otherwise, the temperature of the bonding medium when it impinges the block surface will vary, promoting irregularity in flow, with subsequent variations in the characteristics of the bonding seam.

In the preferred embodiment of this invention, a metal 15, preferably aluminum, is deposited in the grooves 13 and on the block surface at either side of groove 13 in a molten and unoxidized state. To this end, the spray gun 14 should provide the aforementioned oxygenless or deoxidized or inert protective gaseous blanket, such as nitrogen, or deoxidized air, about and around the metallic spray during projection in the form of a tube to protect the spray from atmospheric oxidation, as described in said patent, up to the time the metal sets on the walls of the block. Such deposition is conducive to the best seal, as unoxidized aluminum has an extreme affinity for oxygen, and the glass, being approximately 50% oxygen, acts as a flux in promoting fusion of the metal and glass to form a bond of great strength. Although aluminum is preferred, other metals may be substituted as required.

As is shown in Figs. 2 and 3, the metallic spray is so directed into the V-shaped groove 13 formed by the chamfered joining edges of the block, that the central portion of the spray of greatest density is aligned with the deepest part of the groove 13 and forms an hermetic, secure and evenly-rounded seal 15. It will be observed that the thickness of the seal formed on the block will be directly proportional to the speed of relative movement between the block and the spray gun 14, the density of the metallic spray remaining constant.

Other sealing materials, such as glass, porcelain or other ceramics may be utilized in the place of metal, especially when a particular corrosion-resistant seal is desired. In this procedure of forming the seal, while that described remains basically the same, it is preferred to modify the joining edges of the glass block as shown in Fig. 4, forming thin lips or flanges 16 on the outer part of the chamfered joining edge 12. When the halves of the block are brought together, an undercut or spade-shaped slot 17 is formed. When the glass block is moved through the flame of the spray gun before the molten material is applied, or an equivalent heat zone, the flanges 16 melt, fusing to form a primary seal 18, as shown in Fig. 5, this primary seal resisting vertical stress or shear between the block halves 10. The partially sealed block 11 is then passed before the spray gun 14 and molten glass or other molten sealing material sprayed by the gun on the block over the primary seal 18 to form the completed bond 19, as shown in Fig. 6. This treatment provides a smooth, hermetic seal which is both vertical and horizontal stress-resisting.

It will be observed that whenever molten glass is used as a bonding, sealing or coating material, it becomes an integral part of the block wherever it comes in contact therewith, a factor lending to the strength of the bond.

Desirable internal light-reflecting characteristics may be imparted to the glass block by modifying the metallic seal to provide an internal mirror surface 20 on the block, simultaneously with the formation of the final bond or seal. In this form of the invention, the joining edges 12 of the block are adapted to form a glass-to-glass contact along their entire surfaces, as shown in Fig. 8, the angle of the chamfered groove being considerably wider than that shown in Fig. 3, or even being omitted if greater strength is not required.

In sealing the blocks, best results are obtained if the molten metal, preferably aluminum, is deposited on the walls of the block in an unoxidized state, as discussed heretofore. If this condition is not observed, the aluminum oxidizes while in spray form to obtain a characteristic gray cast having a poor mirroring effect. Also, the bonding is inferior, by reason of the fact that the oxidized metal, having no further affinity for oxygen, does not absorb oxygen from the glass. The mirror surface 20 has the desirable effect of breaking up light beams passing through the block, making an extremely clear and bright finished product by substantially eliminating dark pockets which impart an inferior color cast to the block.

If the glass block has been previously bonded by known methods such as the present dipped seal process, the method of the present invention may be utilized to coat the dipped seal 21 with an acid-resisting seal 22 such as glass or porcelain. With this modification, the blocks 11 are obtained from the sealing machine at a temperature just below that at which the block walls will lose shape with the sealing material still soft. A protective material in molten form is then projected over the seal 21, substantially as shown in Fig. 9. By controlling the distance between the spray gun 14 and the sealed block 11, the protective coating may be deposited thereon to form a smooth seam 22 of desired width. If a rough finish, commonly known as the mortar bearing surface, is desired, particularly for building purposes, the distance between the block 11 and spray gun 12 may be increased and a second coat of protecting material applied over the first, the material impinging the block in partially solidified pitted form, having a decreased temperature not conducive to flowing as a result of the increased distance between the gun and block surface.

If desired, a colored coating material may be applied over the seam 21, obtaining light reflections or color casts through a block. For instance, a blue glass coating 22 will give a blue cast to the block, and by varying the distance between the block and the spray gun and the depth of deposit, the intensity of the color cast may be controlled.

Further, by adjusting the nozzle of the spray gun 14 to evolve a wide angle molten spray, the entire face surfaces of the block 11 may be coated with various materials for imparting color thereto, such as metals, colored glass, or the like. Also the block 11 may be moved about beneath the spray gun according to the area and thickness of coloring treatment desired. By varying the distance between the block and spray gun, either a smooth or rough finish is obtainable. A smooth finish requires the block to be close to the gun in order that the colored material will be applied thereto in a highly molten condition within a heat range for the gun blast which is conducive to flow. In that case, more reciprocations may be required than in the case of the rough or satin finish where the block is a greater distance from the gun, consequently receiving a wider band application. Shade or tone of color is controlled both by the original color of the material to be applied, and the density of application, the latter being controlled by the speed with which the block is passed through the molten spray from the gun.

While the method of this invention has been described with reference to use of specific bonding or coloring materials, such references are made only to indicate preferred combinations, and by way of illustration. Further, while the joining edges of the glass blocks have been described as being specially modified to increase the strength of the bond, the method described herein is equally applicable to glass elements joining to form a block having a continuous wall surface similar to the modification shown in Fig. 8. It is understood that the invention is to be limited as to equivalents only as set forth in the appended claims.

I claim:

1. The method of joining the parts of a multi-part glass element comprising forming the joining edges of at least one of the parts with a groove and overlapping relatively thin lip formation along the length thereof, placing the parts in abutting relation, and heating the parts along the joint to soften the lip and cause it to flow into the groove at the joint to effect a bond between the parts.

2. The method of joining parts of a multi-part glass element, said parts having adjoining edge portions forming a groove and portions overlapping said groove forming sealing lips, comprising placing the parts with the edges in abutting relation, heating the said parts to soften the lips and cause the same to flow into the groove at the edges to form a preliminary seal between the parts, and spraying a molten material having an affinity for the oxygen content in glass on said preliminary seal to securely bond the edges of said parts.

3. The method of joining parts of a multi-part glass element, said parts having adjoining edge portions forming a groove and portions overlapping said groove forming sealing lips comprising placing the parts with the edges in abutting relation, heating the said parts to soften the lips and cause the same to flow into the groove at the edges to form a preliminary seal, and projecting a spray of molten metal confined within an inert gaseous envelope on said preliminary seal to securely bond the edges of said parts.

PURLING A. BLEAKLEY.